July 30, 1946.  E. J. POITRAS ET AL  2,405,052

GYROSCOPIC MECHANISM

Filed Oct. 15, 1935  4 Sheets-Sheet 2

INVENTORS
EDWARD J. POITRAS
JAMES D. TEAR
WILLIAM H. NEWELL

ATTORNEY.

July 30, 1946.　　　　E. J. POITRAS ET AL　　　　2,405,052
GYROSCOPIC MECHANISM
Filed Oct. 15, 1935　　　　4 Sheets—Sheet 3

INVENTORS.
EDWARD J. POITRAS
JAMES D. TEAR
WILLIAM H. NEWELL
ATTORNEY.

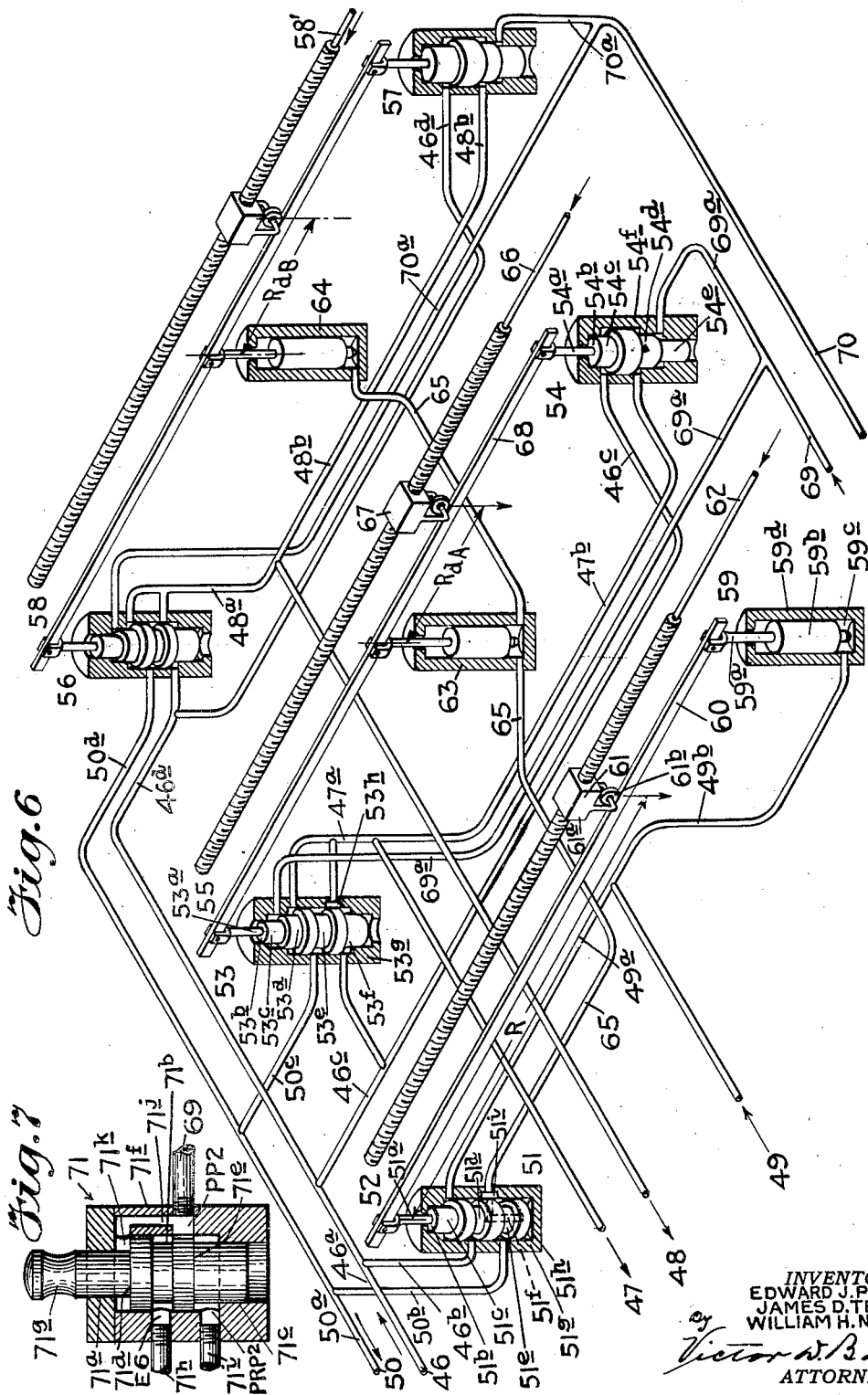

Patented July 30, 1946

2,405,052

UNITED STATES PATENT OFFICE 2,405,052

GYROSCOPIC MECHANISM

Edward J. Poitras, Jackson Heights, James D. Tear, Great Neck, and William H. Newell, New York, N. Y., assignors to Ford Instrument Company, Inc., Long Island City, N. Y., a corporation of New York Application October 15, 1935, Serial No. 45,080

2 Claims. (Cl. 33—46)

The invention herein disclosed relates to a gyroscopic mechanism that is commonly termed an "angle gyro," and which is particularly useful in tracking a target.

In a mechanism of this type, particularly when used for tracking a target, the rates and direction of movement of the target in bearing and elevation are calculated with respect to the observation station. These rates are applied to the gyroscope as precessing forces and the gyroscope follows the movements of the target. The precessing rates are calculated and applied as precessing forces to the gyroscope automatically by mechanism provided for that purpose and follow-up mechanism reproduces the movements of the gyroscope in train and elevation and drives the optics through which the target is observed and also other mechanism if desired.

Heretofore, these operations were performed mechanically, the precessing forces being generated mechanically and applied through levers to the gyroscope. The follow-up mechanism commonly consists of spaced electrical contacts which are intermittently made and broken in accordance with the movements of the gyroscope relative to the gyroscope support. The making and breaking of the contacts controls the operation of electrically actuated apparatus for actuating the optics and whatever other mechanism it is desired to drive in accordance with the movements of the gyroscope relative to its support.

It is an object of this invention to provide a mechanism of this type which is much smoother in operation, which requires less material in its construction, which occupies less space, and which is more satisfactory in operation than similar mechanism heretofore in use.

In accordance with the invention, the gyroscopic mechanism is mounted on a rotatable platform. The necessary precessing forces to effect movement of the gyroscope in train and elevation to track a target are applied hydraulically and they are controlled by a hydraulic, pressure-regulating, calculating, mechanism. This latter mechanism regulates pressures in accordance with the angular rate of change of the target in elevation and bearing from the range and the components of the speed of the target in elevation and bearing with reference to a particular datum line, specifically components at right angles to the line of sight; and these regulated pressures constitute the precessing pressures or forces applied to the gyroscope. The follow-up mechanism is also hydraulically operated and it is controlled by the movements of the gyroscope with respect to its support. The operation of the follow-up is continuous, smooth, and drives the driven objects in synchronous relation to the gyroscope.

A mechanism of this type and embodying the invention is disclosed in the accompanying drawings in which:

Figure 6 is a diagrammatic illustration of the hydraulic calculating mechanism; and Figure 7 is a longitudinal section of a force generator.

Figure 1:
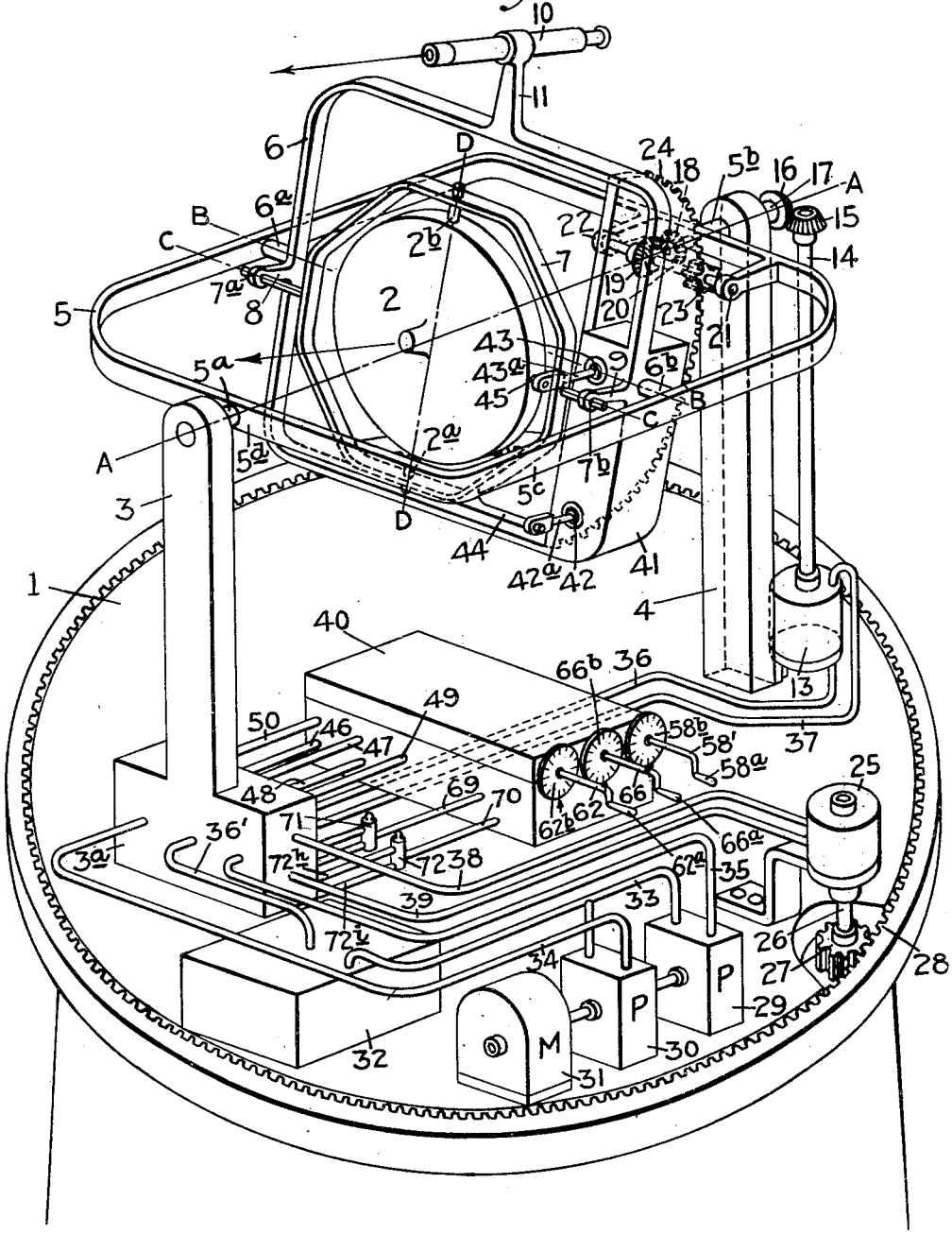
Figure 1 is a diagrammatic illustration of an angle gyro.
Figure 2:
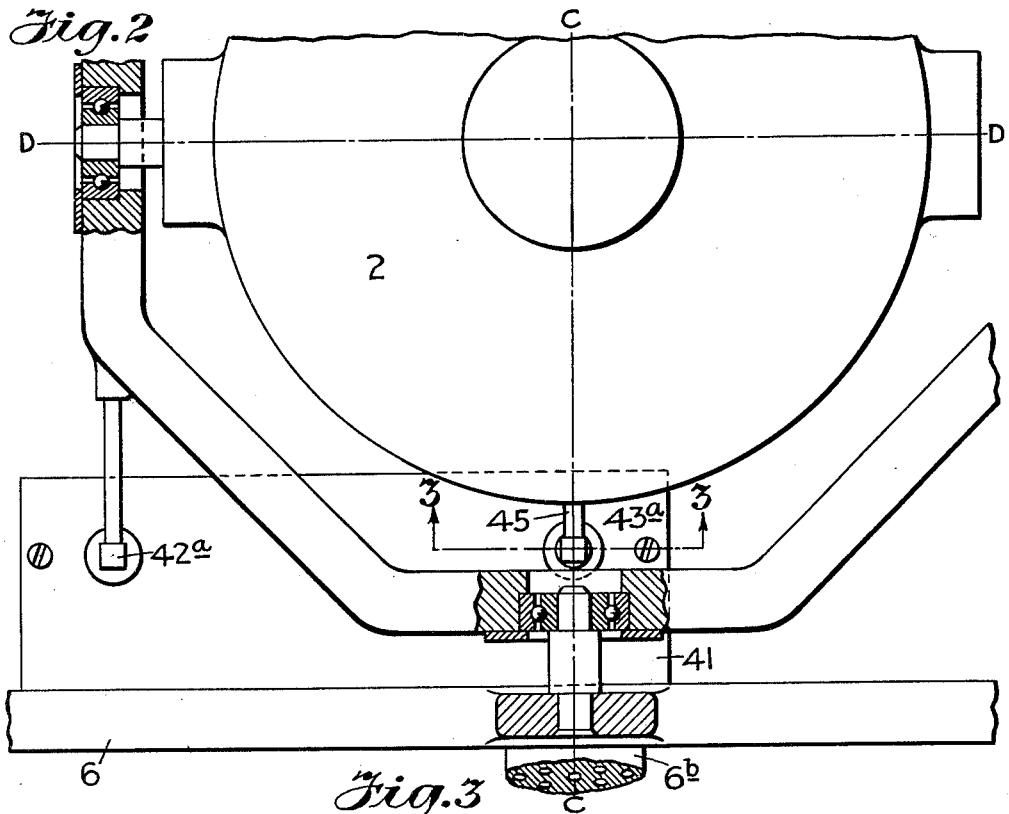
Figure 2 is a fragmentary plan of the gyroscope mounting illustrating the control block.

In Figure 1 of the drawings, the gyroscopic mechanism is illustrated as mounted upon a rotatable platform 1. Commonly, in such apparatus as that illustrated, all associated mechanism is mounted on the same rotatable platform although this is not necessary since such rotary movement that is utilized in the apparatus may be transmitted to it by Selsyn systems, the receivers of which are mounted on the platform.

The gyroscope 2 is mounted in a gimbal system supported by spaced standards 3 and 4 extending vertically from the platform 1. The standards support the gyroscope frame 5 which is rotatably mounted in the standards for movement about an axis A—A through trunnions 5a and 5b extending from the frame and journaled in the standards 3 and 4 respectively. Within the frame 5, there is a phantom ring 6 mounted for rotary movement about an axis B—B, at right angles to the axis A—A, through trunnions 6a and 6b journaled in the frame 5. A gimbal ring 7 is rotatably mounted in standards 8 and 9 extending from the phantom ring through trunnions 7a and 7b respectively journaled in the standards 8 and 9. The gimbal ring is mounted for movement about an axis C—C, parallel to the axis B—B. The gimbal ring carries the gyroscope 2 which is mounted in the gimbal ring for movement about an axis D—D, perpendicular to the axis C—C, through trunnions 2a and 2b journaled in the gimbal ring. The gyroscope so freely mounted is free for movement in elevation about axis C—C, and for movement in train about axis D—D. A telescopic sight 10 is secured to a support 11 which is secured to ring 6, such that the optical axis of telescope 10 is parallel to the spin axis of gyroscope 2.

When the mechanism is mounted on an unstable platform the frame 5 is cross-leveled about the axis A—A in accordance with a level gyroscope, or a stable vertical so that the axes B—B and C—C are maintained horizontal. This may be accomplished by any means well known in the art, such as a manually operated horizon telescope or a sector gear rotated in accordance with a level gyroscope.

The phantom ring 6 is actuated about the axis B—B to follow the movements of the gyroscope in elevation and relative to the frame by a hydraulic motor 13 mounted on the platform 1. The shaft 14 of the motor 13 drives a bevel gear 15 which is secured to the shaft and which meshes with a bevel gear 16 mounted on a shaft 17 extending through and journaled in the trunnion 5b of the frame. On the end of the shaft 17 within the frame 5, there is mounted a bevel gear 18 which meshes with a similar gear 19 secured to a jack-shaft 20 journaled in spaced bearing brackets 21 and 22 extending from the frame 5. Formed integral with the gear 19, there is a pinion 23 which meshes with a segmental gear 24 secured to the phantom ring 6 in a plane perpendicular to the plane of the phantom ring. Through these shafts and this gear train, the phantom ring 6 is moved by the motor 13 about the axis B—B. The position of shaft 17, which rotates in proportion to the movement of the phantom ring, therefore, represents the elevation plus some function of the cross-level angle (which may for the purpose of this description be disregarded). It is also used to drive some object in accordance with the movements of the phantom ring.

The platform 1 is rotated by a hydraulic motor 25 secured to the platform. The shaft 26 of the motor 25 extends through the platform and has secured thereon a pinion 27 which meshes with a circular, stationary rack 28. Thus, rotation of the motor shaft 26 effects rotation of the platform 1.

A hydraulic medium, such as oil, under pressure is supplied, for operating the motors 13 and 25, by pumps 29 and 30 respectively, there being a pump for each motor. These pumps are driven by an electric motor 31 to which they are directly connected and by which they are operated continuously while the mechanism is in use. The pumps receive oil from an oil container 32 to which the inlet ends of the pumps are connected by a pipe 33. The discharge ends of the pump are connected by pipes 34 and 35 to a valve block 3a formed on the standard 3, which is also connected to the oil container through a discharge pipe 36'.

The valve block 3a contains a control valve and a pressure regulating valve for each of the motors 13 and 25 through which the delivery pressures of the oil is regulated and the operation of the motors is controlled. The motor 13 is connected to the valve block by pipes 36 and 37 and the motor 25 is connected to the valve block by pipes 38 and 39. The valve block 3a also contains ordinary reducing and constant pressure valves for supplying oil under constant pressure to the hydraulic computer 40 and for the hydraulic control system for controlling the operation of the motor control valves from the control block 41 mounted on the phantom ring 6. The block 41 carries pilot control valves 42 and 43 which control the operation of the motors 13 and 25 respectively and through which precessing forces are applied to the gyroscope. These valves communicate with chambers and ports in the valve block 3a through ports and passages extending through the trunnion 6b, arms 5c and 5d of the frame 5, trunnion 5a and standard 3.

The manner in which the precessing forces are applied to the gyroscope, and operation of the motors 13 and 25 is controlled by pilot valves 42 and 43 is clearly and fully described in the copending application of Edward J. Poitras and James D. Tear, entitled Gyroscope precessor and follow-up, filed April 11, 1939, Serial No. 267,248 and will be described in detail hereinafter. The valve 42 is connected by a valve stem 42a to a pin 44 extending from the gimbal ring 7 and the valve 43 is connected by a valve stem 43a to a pin 45 extending from the gyroscope and at right angles to the axis D—D. Thus, upon movement of the gyroscope in elevation relative to the frame, the valve 42 is actuated and effects the operation of the motor 13 to cause the phantom ring 6 to follow the movement of the gyroscope. Likewise if the gyroscope moves about the axis D—D the valve 43 is actuated to effect the operation of the motor 25 and causes the platform 1 to be trained in accordance with the movements of the gyroscope; the amount which the platform is trained upon movement of the gyroscope about the axis D—D depends on the inclination of the gyroscope axis to the horizontal and in all cases is an amount to maintain the gimbal ring 7 parallel to the plane of the gyroscope 2.

The forces for effecting the precession of the gyroscope are applied to the pilot valves 42 and 43 as hydraulic pressures which are regulated or controlled by the pressure-regulating, hydraulic computer 40. This computer, illustrated diagrammatically in Figure 6 of the drawings, contains a hydraulic divider and two hydraulic multipliers such as the dividing and multiplying mechanism illustrated and described in detail in the copending application of William H. Newell, entitled Hydraulic computer, filed October 15, 1935, Serial No. 45,052, to which reference may be had for a detailed description of the individual units of the computer and which will be described hereinafter. The computer is hydraulically connected to the valve block 3a by an oil supply pipe 46 through which oil under pressure is supplied to the computer, a precessing pressure pipe 47 through which pressure is transmitted to the valve 43 to effect precession of the gyroscope in elevation, a precessing pressure pipe 48 through which pressure is transmitted to the valve 42 to effect precession of the gyroscope in train, an oil supply pipe 49 through which oil under a constant pressure is supplied to the computer as a reference pressure, and an exhaust pipe 50.

The motor controls

Figure 3:
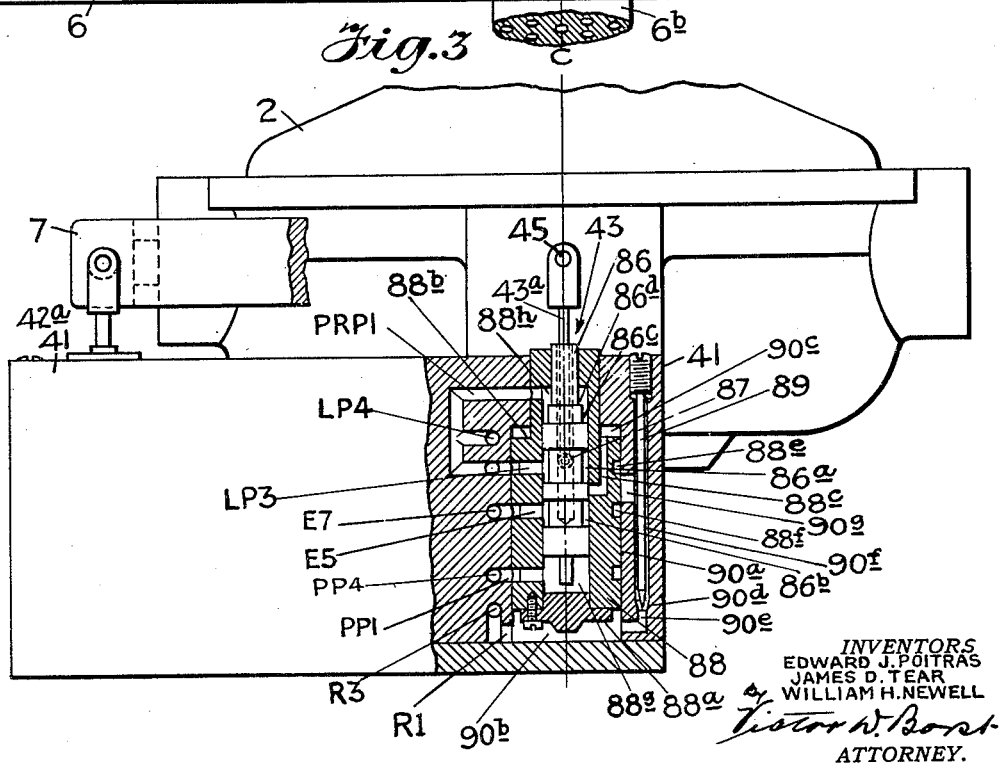
Figure 3 is a fragmentary elevation of the gyroscope and control block, partly in section.
Figure 4:
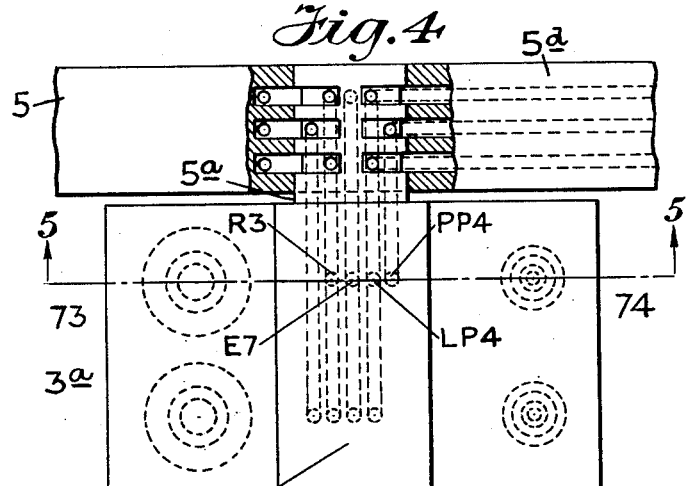
Figure 4 is a plan of the valve block.
Figure 5:
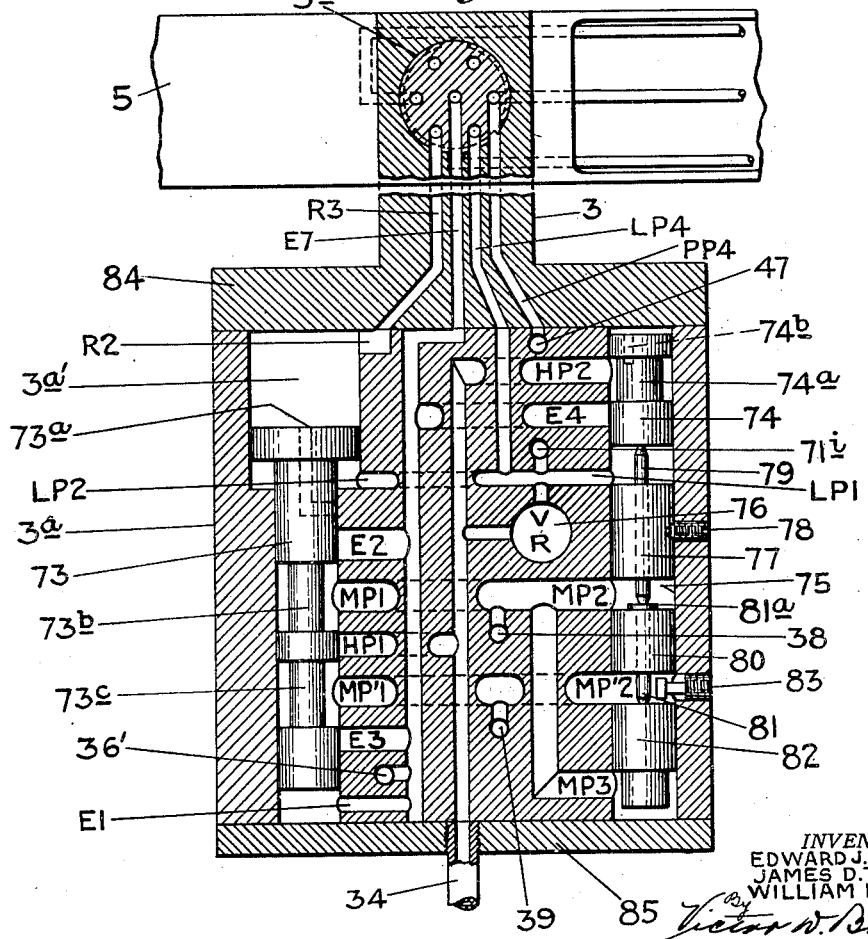
Figure 5 represents a sectional elevation of the same.

The manner in which the various controls, force generators and valve blocks are constructed and operate is illustrated in Figures 3 to 5 inclusive and Figure 7. The individual controls for the motors are separate and distinct, but they are identical for the two motors. Therefore, only the control for the motor 25 will be described in detail, it being understood that the control for the motor 13 is identical in all respects. The flow of fluid to the motor 25, and, therefore, the operation of the motor, is controlled directly by a main piston valve 73 (Fig. 5) slidably mounted in the valve block 3a and the pressure of the oil supplied to the motor is regulated by a regulating valve 74 also slidably mounted in the valve block 3a. The valve 73 is a four-way valve and controls the direction of the flow of oil to the motor as well as the rate of flow and thus the direction and speed of the motor. The regulating valve regulates the pressure of the oil supplied to the motor in accordance with the drop in pressure across the motor plus a constant pressure. In this way there is maintained a constant drop in pressure across the main valve and a more delicate control of the motor is assured.

Throughout the following description and in the drawings, the following characters and legends have been used and indicate on the drawings the interconnection of the various ports:

HP_____ High or pump pressure.
MP_____ Motor pressure.
LP_____ Low pressure obtained from a reducing valve 76 (Fig. 5).
E_____ Exhaust.
R_____ Reference volume.
PRP_____ Precessing reference pressure.
PP_____ Precessing pressure.

The various ports in the valve blocks are designated by the various combinations of letters above indicated and a numeral. Those ports having as a part of the designating characters one of the above combinations of letters are interconnected and are connected to the oil supply or exhaust indicated by the combination of letters.

The valve 73 is operated hydraulically, in a manner which will hereinafter be described in detail, through a piston 73a formed on the end thereof. The valve 73 has two reduced sections 73b and 73c spaced longitudinally thereof. The lower end of the valve chamber is connected through a port E1 to the exhaust lead 36' so that the valve is free to move longitudinally in the valve chamber. The valve controls communication between the ports E2 and MP1, between ports MP'1 and E3, and between port HP1 and ports MP1 and MP'1. The ports MP1 and MP'1 communicate respectively with the motor leads 38 and 39; the ports E2 and E3 communicate with the exhaust lead 36' and the port HP1 communicates with the pressure lead 34. In the position illustrated in Figure 5, the valve laps the ports E2, HP1 and E3 so that when the valve is in this position the motor 25 is not operating. If the valve is moved upwardly, for example, from the position shown in Figure 5, the ports MP1 and E2 will be placed in communication and also the ports HP1 and MP'1 will be placed in communication. Oil will thus flow to the motor through the port MP'1. If on the other hand the valve 73 is moved downwardly from the position illustrated in Figure 5, the port MP1 will then communicate with the port HP1 and the port MP'1 will communicate with the exhaust port E3 and the oil under pressure will flow to the motor in the opposite direction.

The regulating valve 74 is also a piston valve and has a reduced section 74a which is adapted to control communication between the ports HP2 and E4. This regulating valve, as heretofore stated, is operated so that the pressure of the oil supplied by the pump is equal to the pressure drop across the motor plus a constant pressure so that the drop in pressure across the valve 73 is maintained constant. The relation may be indicated by the following formula:

$$HP = LP + (MPH - MPL)$$

in which HP is the working or pump pressure as regulated by the regulating valve, LP is a constant low pressure supply which is obtained by a reducing valve 76 located in the block 3a, MPH is the pressure of the oil in one of the motor leads, the high pressure side of the motor, and MPL is the pressure on the other motor lead, the low pressure motor lead.

The valve 74 is actuated to provide this regulation through the mechanism illustrated in Figure 5. The valve 74 is mounted in a bore or an elongated chamber 75 of circular cross-section extending through the block 3a. Below the valve, and spaced therefrom there is a block 77 secured in the chamber 75 by a set screw 78. The block 77 is bored axially and there is a rod 79 extending through the block and slidably mounted therein. Below the block 77 and spaced therefrom there is another block 80 which is slidably mounted in the chamber 75. The block 80, like the block 77, is bored axially thereof and through this bore a rod 81 extends and is slidably mounted therein. The rod 81 is provided with an enlarged head 81a to form an abutting surface for the end of the rod 79. A third block 82 is slidably mounted in the chamber 75 and is adapted to abut against the lower end of the pin 81. Between the blocks 80 and 82 there is provided an abutment pin 83 which extends into the chamber between the blocks and prevents the block 80 from moving too far in the direction of the block 82. The slidably mounted blocks 80 and 82 act in the nature of pistons in a manner hereinafter described.

A low pressure port LP1 communicates with the chamber 75 between the valve 74 and the upper end of the block 77, a port MP2 communicates with the chamber 75 between the lower end of the block 77 and the upper end of the block 80, a port MP'2 communicates with the chamber 75 between the lower end of the block 80 and the upper end of the block 82, and a port MP3 communicates with the chamber 75 below the lower end of the block 82. The block 82 has its lower end reduced as indicated so that the port MP3 will not at any time be cut off from communication with the lower end of the chamber 75. The ends of the chamber 75 are closed by the cap 84 and the bottom plates 85, which also close the ends of the chamber for the valve 73. The ports HP1 and HP2 are connected through a common lead to the high pressure lead 34 of the pump 30; the port E4 is connected to the exhaust; and the port LP1 is connected to the low pressure supply. The ports MP1, MP2 and MP3 are connected together and to the motor lead 38 and the ports MP'1 and MP'2 are connected together and to the motor lead 39. In the valve 74 there is a passage 74b which connects the annular chamber formed by the reduced portion 74a of the valve with the valve chamber above the valve 74. Since this reduced portion of the valve is, as will be apparent from the drawings, always connected to the pressure port HP2, the pressure of the oil in this port will act against the end of the valve tending to force the valve downwardly from the position illustrated in Figure 5 and thus open the pressure port HP2 to the exhaust port E4 and lower the pressure in the presure line to which the port HP2 is connected.

The force exerted by the oil in the chamber above the valve 74 is resisted by the pressure of the oil admitted through the low pressure port LP1 and the difference between the pressure in the ports MP2 and MP'2. It will be observed that pressure of the oil in the port MP2 acts upon the block 80 tending to move the block downwardly against the pin 83. Pressure in the port MP'2 acts between the blocks 80 and 82 tending to separate these blocks and move the block 80 upwardly and the pressure of the oil admitted through the port MP3 tends to move the block 82 upwardly against pin 81. For the purpose of explaining the action of this mechanism, let us assume for the moment that MP is the pressure of the oil on the high pressure motor lead, and MP' is the pressure of the oil on the low pressure side of the motor, that is, that the valve 73 is moved downwardly from the position shown. In such an event, the pressure of the oil admitted through the port MP2 will cause the block 80 to abut against the abutment 83. The pressure of the oil admitted through the port MP'2 will act upon the end of the block 82 and the pressure admitted through the port MP3 will act upon the opposite end of the block 82. Thus, the force exerted upon the pin 81 will be proportional to the difference between the pressure of the oil admitted through the port MP'2 and the port MP3. This force will act through the rod 79 on the valve 74 and added to that force there will be the force of the oil admitted through the low pressure port LP1. The valve 74 will thus be actuated in accordance with the formula as given above.

If the main valve 73 is so operated that the port MP'1 becomes the high pressure port of the motor and the port MP1 becomes the low pressure port of the motor, so that the port MP'2 admits oil at the high pressure and the ports MP2 and MP3 admit oil at the pressure of the exhaust side of the motor, the valve 74 will be regulated again in accordance with the formula given above, that is, in accordance with the sum of the low pressure plus the difference between the pressure in the port MP'2 and the pressure in the port MP2. The operation will be as follows: The pressure of the oil admitted through the port MP'2 being greater than the pressure of oil admitted through the port MP3, the block 82 will be forced against the bottom plate 85 and the pressure of the oil will act to move the block 80 upwardly carrying the rod 81 and pressing against the end of the pin 79. Movement of the block 80 upwardly will be resisted by the low pressure oil in the port MP2 so that the force on the pin 79 will be proportional to the difference between these two oil pressures and the force on the valve 74 will be the sum of this force and the force exerted by the low pressure oil admitted through the low pressure port LP1. In this manner the drop in pressure across the valve 73 between the high pressure lead of the motor and the low pressure lead of the motor, for a given torque requirement of the motor, irrespective of the direction of operation of the motor, is maintained constant. With the drop in pressure across the valve maintained constant in this way, the flow of fluid through the valve is proportional to the valve opening, and, therefore, the speed of the motor is proportional to the valve opening.

As heretofore stated, the valve 73 is operated hydraulically through the piston 73a. The piston 73a is a differential piston. The surface area of the upper side of this piston as seen in Figure 5 is approximately twice as great as that of the lower surface of the piston. Between the lower surface of the piston and the end of the chamber in which the piston operates, there is a low pressure port LP2 communicating with the chamber so that oil at a constant pressure acts upon the lower surface of the piston. That part of the chamber above the piston forms a part of a reference volume, and as will be evident, the valve may be operated by increasing or decreasing the pressure of the reference volume above or below one-half of the low pressure since the area of the piston upon which the reference volume acts is twice as large as the area upon which the low pressure acts. It is in this way that the valve 73 is operated.

The pressure of the reference volume is controlled by a pilot valve 86 mounted in the control or valve block 41 and secured to the control element 43a, which constitutes a valve stem (Fig. 3). The valve 86 is hollow for a portion of its length and the rod 43a extends into the valve and is secured therein through a pivot 87. This pilot valve is slidably mounted in a plunger 88 having ports and passages which are controlled by the valve. The valve has two reduced portions 86a and 86b spaced longitudinally thereof. The plunger 88 in which the valve 86 is slidably mounted is operated upon by differential pressures and the area of the lower surface 88a is equal to twice the area of the surface 88b. The plunger is slidably mounted in a chamber 90a formed in the valve block 41. The chamber 90b formed below the plunger 88 constitutes a part of the reference volume and communicates through a port R1 and passages R3 in the block 41, trunnion 6b, frame 5, trunnion 5a, and standard 3 with a port R2 communicating with the reference volume chamber 3a' above the piston 73a in the valve block 3a, (Fig. 5). It will thus be seen that movement of the plunger 88 downwardly increases the pressure of the oil in the reference volume chamber which acts upon the larger surface of the piston 73a secured to the valve 73. Likewise upward movement of the plunger 88 reduces the pressure in this chamber. Under normal conditions with the plunger 88 and the valve 73 in the position illustrated in Figures 3 and 5, the pressure in the reference volume is one-half the pressure of the low pressure supply.

Movement of the valve 86 admits low pressure to and exhausts low pressure from the chamber 90c formed between the upper end of the plunger and the end of the plunger chamber 90a, thus effecting either downward or upward movement of the plunger to effect the operation of the valve 73. This is accomplished through a low pressure port LP3 extending through the plunger and connected by passage LP4 through the block 41, trunnion 6b, frame 5, trunnion 5a and standard 3 with the low pressure port LP1 in valve block 3a; and by an exhaust port E5 likewise extending radially through the plunger and communicating with lead 36' through passage E7 through the same path. The valve 86 controls communication between these ports and a passage 88c which communicates with the chamber 90c. For example, if the valve 86 is moved downwardly from the position illustrated, the port LP3 is placed into communication with the passage 88c and pressure is admitted to the chamber 90c thus causing the plunger to move downwardly. On the other hand, if the valve 86 is moved upwardly from the position shown in Figure 3, the exhaust port E5 is placed into communication with the passage 88c and the pressure in the chamber 90c is reduced so that the plunger moves upwardly and the pressure of the reference volume is temporarily reduced. This arrangement provides what might be termed a power amplifying system and by means of it, the valve 73 is actuated to control the motor by an infinitesimal pressure on the valve 86. There is, therefore, practically no reaction on the gyroscope to effect the control of the motor.

In the follow-up action of the motor 25, the operation of the system is as follows: Assume that the gyroscope is moved about the axis D—D by the application of a precessing force through the control element 42a so that the valve 86 is moved downwardly. In the manner heretofore explained, oil under the low pressure is admitted to the chamber 90c and the plunger 88 moves downwardly increasing the pressure in the chamber 90b and consequently in the chamber 3a' in the valve block 3a. This causes the valve 73 to move downwardly from the position shown in Figure 5. Under such circumstances, as heretofore explained, the port HP1 and the port MP1 are connected together and the ports MP'1 and E3 are connected together. The regulating valve is of course functioning at all times and consequently the drop in pressure between the port HP1 and the port MP1 is constant, as explained above. The motor 25 is thus operated, and through the shaft and gears actuates the platform 1 in a direction to follow the movement of the gyroscope. As the platform moves, the phantom ring also moves and consequently the valve block 41 follows the movement of the valve. This is a relative movement and therefore alters the relation of the valve to the plunger. It will be understood of course that when the valve was moved the plunger moved in the same direction as the valve. In fact the difference in movement between these two elements is imperceptible. The plunger continues to move until the communication between the low pressure port LP3 and the chamber 90c is cut off. On movement of the platform, through the operation of the motor, there is the same effect as though the valve 86 were moved in the opposite direction, thus placing the chamber 90c in communication with the exhaust port E5. The pressure in the chamber 90c is thus reduced and the plunger moves upwardly until this communication is cut off at which time the operation of the motor ceases as the valve 73 is then in the position illustrated in Figure 5. The operation of the system is the same in the reverse direction.

*Synchronizing valve*

It will be apparent that in the operation of the system as described above, there will be a lag between the movement of the gyroscope and the movement of the platform. In order to remove this lag, and have the platform and the gyroscope operate synchronously, there is provided a synchronizing valve 89. The synchronizing valve 89 is a needle valve and cooperates with a valve seat 90d to control communication between a passage 90e formed in the valve block and communicating with the reference volume chamber 90b, and a passage 90f formed in the valve block 41. A port 90g extends laterally of the passage 90f. Communication between this port 90g and the low pressure port LP3 and the exhaust port E5 is controlled by movement of the plunger. The plunger has two reduced portions 88e and 88f. These reduced portions are on opposite sides of the port 90g and are such that when the plunger 88 moves downwardly, the port 90g is connected to the low pressure port LP3 and when the plunger moves upwardly, the port 90g is placed into communication with the exhaust port E5. Thus when the plunger moves downwardly from the position shown to increase the pressure in the reference volume 90b oil under low pressure flows from the port LP3 through the port 90g, the passage 90f, valve 90d, passage 90e to the reference volume 90b and thus augments the effect of the movement of the plunger by gradually increasing the volume of oil in the reference volume 90b. Through the same ports and passages, when the plunger moves upwardly to decrease the pressure in the chamber 90b, the chamber 90b is placed in communication through the needle valve with the exhaust port E5 thus augmenting the effect of the plunger by allowing oil to escape from the reference volume chamber 90b. The needle valve is adjusted empirically and its effect is to advance the movement of the valve 73 so that the platform operated by the motor is advanced into synchronism with the gyroscope.

The above describes the manner in which movements of the gyroscope are reproduced by the platform and any object driven by the shaft 26. In the same manner, the motor 13 is controlled to cause the phantom ring 6 to follow the movements of the gyroscope about the axis C—C and to drive any object coupled to the shaft 17 in accordance with the movement of the gyroscope about this axis.

Within the computer, the pipe 46 is connected to a passage 46a which communicates, through a branch passage 46b, with the pressure regulator 51 of a dividing unit designated generally by the numeral 52, through a branch passage 46c with a pressure regulator 53 and a force applicator 54 of a multiplying unit designated generally by the numeral 55, and through a branch passage 46d with a pressure regulator 56 and a force applicator 57 of a multiplying unit designated generally by the numeral 58. The exhaust pipe 50 communicates with a passage 50a which communicates through a branch passage 50b with the pressure regulator 51, through a branch passage 50c with the pressure regulator 53 and through a branch passage 50d with the pressure regulator 56. The pipe 49 communicates through passages 49a and 49b with the pressure regulator 51 and a force applicator 59 of the unit 52; the pipe 47 communicates through passages 47a and 47b with the elements 53 and 54 of the unit 55; and the pipe 48 communicates through passages 48a and 48b with the elements 56 and 57 of the unit 58.

The dividing unit 52 consists of the pressure regulator 51, the force applicator 59, a beam 60 and a movable fulcrum 61 for the beam 60. A stem 51a extending from the pressure regulator is pivotally secured to one end of the beam 60 and a stem 59a extending from the force applicator 59 is pivotally secured to the other end of the beam 60. The fulcrum 61 consists of a carriage 61a which is threaded on a screw shaft 62 which when rotated causes the carriage to move lengthwise of the beam. A roller 61b carried by the carriage 61a is in contact with the beam and constitutes the fulcrum proper. The pressure regulator 51 consists of a block 51g hollowed out in circular cross-section in which slides plunger 51b which has three reduced portions 51c, 51d and 51e. These reduced portions, cooperating with the terminals of pipes 46b, 50b, and 49a, form valve ports by which the movement of the plunger 51b is controlled and the balancing pressure in pipe 65 is regulated. The bottom face of plunger 51b forms with the bottom of the cylinder portion of block 51g a chamber 51h which is in communication with pipe 65 through passage 51f and port 51i. The plunger 51b is kept in its mean position by controlling the volume of the balancing liquid in chamber 51h. This is accomplished by oil from a constant pressure being supplied to chamber 51h through pipe 46b, reduced area 51d and passage 51f, if plunger 51b moves down far enough to place the port 51i in communication with the reduced portion 51d, or permit oil to flow to the exhaust line 50b, if plunger 51b moves up enough to place port 51i in communication with reduced portion 51e.

The force applicator 59 consists of a block 59d hollowed out in circular cross-section in which slides plunger 59b. Plunger 59b is connected at its upper end to beam 60 by rod 59a and forms at its lower end one face of chamber 59c, which is in communication with pipe 49b.

In operation, the screw shaft 62 is rotated by handle 62a an amount proportional to the range of the target from the observation station. The instantaneous values of the range are available visually by means of a scale 62b cooperating with a reference mark on the calculator 40. The fulcrum about which the beam 60 acts is thereby moved a distance "R" away from the point of application of the force exerted by the pressure regulator 51. The oil under constant pressure in the pipe 49 and associated passages acts upon plungers in pressure regulator 51 and the force applicator 59 in opposite directions to impress a couple upon the beam, the force of the regulator plunger acting downwardly and the force of the applicator acting upwardly. In the pressure regulator, there is produced a pressure which acts in a direction opposite to the force resulting from the oil under pressure supplied through the pipe 49. The pressure produced is such that the moment of the resulting force acting on the plunger balances the impressed couple. From this relation of forces we have the following equation:

$$F \cdot L = F' \cdot R$$

in which F is the force of the impressed couple, L is the length of the beam, F' is the balancing force and R is the length of lever through which the force acts, that is, the distance of the fulcrum from the axis of the pressure regulator. From the above there is obtained $$F' = \frac{F L}{R}$$

Since L and F are constant, the force F' and the pressure produced are proportional to 1/R.

This pressure that is proportional to the reciprocal of the range is applied to force applicators 63 and 64 of the multiplying units 55 and 58 respectively. These force applicators are connected to the chamber of the pressure regulator 51 in which this pressure is generated by a pipe 65. In the unit 55 this pressure is multiplied by the component of the speed of the target in elevation and perpendicular to the line of sight known as "RdA" to obtain a pressure proportional to the angular rate of change in elevation known as "dA"; and in the unit 58, this pressure proportional to 1/R is multiplied by the component of the speed of the target in bearing and perpendicular to the line of sight known as "RdB" to obtain a pressure proportional to the angular rate of change in bearing, "dB."

The quantities RdA and RdB are obtained from a calculating mechanism of any of the well known types used for this purpose such as that shown in Patent No. 1,450,585. The quantity RdA is inserted in the unit 55 by rotating a screw shaft 66 similar to the screw shaft 62. Rotation of the screw shaft 66 by handle 66a moves the movable fulcrum 67 along a beam 68 away from the midpoint of the beam, at which point the plunger of the force applicator 63 is pivotally secured to the beam, a distance proportional to RdA. The instantaneous value of this rate RdA is available visually by means of a scale 66b secured to shaft 66 and cooperating with a reference mark on the calculator 40. The plunger of regulator 53 is pivotally secured to one end of the beam and the plunger of the force applicator 54 is pivotally secured to the other end of the beam 68. These plungers are arranged and interconnected so that pressures acting thereon are equal and act in opposite directions to impress a couple on the beam.

Pressure regulator 53 consists of a block 53g hollowed out, in circular cross-sections, to receive and permit vertical movement of a plunger 53b having four reduced portions, 53c, 53d, 53e and 53f. These reduced portions cooperating with the terminals of pipes 46c, 50c, 47a and 69a in block 53g form ports by which oil under pressure is regulated. Plunger 53b is kept in its mid position, in a manner similar to that in pressure regulator 51, by oil supplied under constant pressure through pipe 46c, acting on the lower surface of portion 53d through port 53h and passage 47a, when plunger 53b is high enough for port 53h to be in communication with portion 53f or by permitting oil to drain to exhaust pipe 50c when plunger 53b is low enough for port 53h to be in communication with portion 53e.

Force applicator 54 consists of a block 54f hollowed out in circular cross-section to receive and permit vertical movement of a plunger 54b having three reduced portions 54c, 54d and 54e. These reduced portions cooperating with the terminals of pipes 46c, 47b and 69a in block 54f form ports by which oil under pressure is applied to beam 68 through rod 54a connecting plunger 54b to beam 68.

Pressure regulator 53 and force applicator 54 are connected together as follows: Reduced portions 53d and 54d by pipes 47a and 47b; reduced portions 53f and 54c by branches of pipe 46c; and reduced portions 53c and 54e by branches 69a of pipe 69.

The force F" exerted on the plunger of the force applicator 63 by the pressure proportional to 1/R creates a moment of F"·RdA. The moment of this force is balanced by a couple controlled by the pressure regulator 53 and acting on the plungers of regulator 53 and the force applicator 54. From this relation, we have $$F'' \cdot RdA = F''' \cdot L'$$

in which F" is as explained above; RdA is the lever arm through which this force acts; F''' is the force resulting from the pressure in the pressure regulator 53; and L' is the length of the beam. And, $$F''' = \frac{F'' \cdot RdA}{L'}.$$

Substituting k/R for F" we have $$F''' = \frac{k/R \cdot RdA}{L'}$$

and $$F''' = \frac{kdA}{L'}$$

where k is a constant. Since L' and k are constants, F''' and the pressure of which F''' is the result are proportional to $dA$, the angular rate of change of the target in elevation.

This pressure is applied to the valve 43 to effect precession of the gyroscope about the axis C—C at the same rate as the target is changing its elevation angle. Similarly, a pressure proportional to $dB$ is obtained from the unit 58, which is similar in all respects to the unit 55, by moving shaft 58' by crank 58a in accordance with the change in rate in azimuth of the target, $RdB$. The instantaneous value of this rate is available visually by means of a scale 58b secured to shaft 58' and cooperative with a reference mark on the calculator 40. The pressure proportional to $dB$ is applied to the valve 42 to effect precession of the gyroscope in train at the same rate as the target. Such movement of the gyroscope causes, in the manner heretofore described, operation of the follow-up motors 13 and 25 to maintain the phantom ring 6 parallel to the plane of spin of the gyroscope and to drive mechanism in accordance with the movements of the gyroscope.

Also connected to the computer 40, there are two pipes 69 and 70 which transmit pressures to be added to or subtracted from the results obtained from the multiplying units 55 and 58. The pipe 69 communicates through a passage 69a with the pressure regulator 53 and the force applicator 54 of the unit 55, and the pipe 70 communicates through a passage 70a with the pressure regulator 56 and the force applicator 57 of the unit 58. The pressure of the fluid in these pipes, which may be raised or lowered by manual control, acts in opposition to the regulated pressure so that a pressure equivalent to the effective pressure in these lines may be added to the result of the multiplication. In like manner, a pressure may be subtracted from the results of the multipliers. The addition and subtraction of such pressures is for the purpose of introducing quantities called "spots" and are used to correct the precessing rates if the optics which are driven by the gyro do not keep on the target as observed by an observer. The addition and subtraction of the pressures in pipes 69 and 70 are obtained by connecting them to a source of pressure or an exhaust passage through the manually operated two-way valves or force generators 71 and 72 respectively. The other sides of these valves are connected by pipes 71i and 72i to a pressure source in block 3a such as HP1 and by pipes 71h and 72h to an exhaust passage in block 3a, such as E1.

*Precessing mechanism*

The details of the manner in which precession forces are applied to the gyroscope in this system will now be described. For each control element 42a and 43a the precessing mechanism is duplicated so that there is individual control for precessing the gyroscope about the axes C—C and D—D. These controls are identical and therefore there will only be described the mechanism utilized in applying a force to the gyroscope through the control element 43a to effect precession of the gyroscope about the axis C—C.

Precessing of the gyroscope about the axis C—C is effected by hydraulic pressure acting upon the valve 86 and through the valve stem applying a force to the gyroscope. For this purpose the valve 86 is reduced at 86c and 86d in diameter to form in effect a piston face equal in area to the sum of the areas of the two shoulders formed by the successive reductions in diameter. The combined area of these two shoulders is one-half of the area of the lower end of the valve which forms an end wall of a chamber 88g in the lower end of the plunger. A port PRP1 communicates with the annular chamber 88h formed in the plunger by the reduction in diameter of the valve, and a port PP1 communicates with the chamber 88g. These ports are such that irrespective of the movement of the plunger 88, they are at all times in communication with their respective chambers. The port PRP1 communicates with a supply of low pressure oil utilized as a precessing reference pressure, which may conveniently be supplied and maintained constant by the reducing valve 76 (Fig. 5) with which the port PRP1 is connected through passage LP4. The port PP1 communicates with the precessing pressure in the lead 47 by way of passage PP4, through the block 41, trunnion 6b, frame 5, trunnion 5a, standard 3 and the connection in the valve block 3a.

It is important to note that there is no movement of the valve 86 under the action of the precessing forces, for in accordance with the phenomena of the gyroscope, the gyroscope precesses about an axis at right angles to the axis about which the precessing force tends to rotate the gyroscope, i. e. in this instance the application of a force through the valve 86 will cause the gyroscope to rotate about the axis C—C, and similarly a force exerted by the element 42a and tending to rotate the gyroscope about the axis C—C, will cause the gyroscope to precess about the axis D—D.

The force generator 71 for manually augmenting or decreasing the pressure in pipe 69 consists of a block 71f (see Figure 7) bored axially to provide a chamber for a piston valve 71g. The valve 71g has three reduced portions 71a forming the stem, 71b at the approximate longitudinal center and 71c. The shoulder 71d formed by reducing the diameter at 71a constitutes a pressure face upon which the pressure in pipe 69 acts at all times; similarly the shoulder 71e formed by reducing the diameter at 71c forms a pressure face upon which the precessing reference pressure PRP, which is equal to LP, acts at all times. The force exerted upon these pressure faces are opposed; the pressure face 71d is twice the area of the pressure face 71e and the reference pressure is twice as great as the normal pressure in the pipe 69. Therefore, the valve is normally balanced.

Through the block 71f, there is formed a pressure port PP2 which is connected to the pipe 69. A passage 71j connects the port PP2 with the chamber 71k formed above the shoulders 71d. The valve 71g controls communication between this port PP2 and an exhaust port E6, connected to the exhaust lead 71h, and a precessing reference pressure port PRP2, connected by the lead 71i to the reducing valve 76 through which the oil under pressure for precessing the gyroscope is supplied.

It will be apparent that in the condition of the ports illustrated in the drawings, the forces acting on the valve are equal and opposite. The precessing reference pressure is constant and the pressure in port PP2 and pipe 69 may be raised or lowered by manipulating the valve 71g of the force generator. For example, if a downward force is applied to the valve 71g the valve is moved downwardly from the position illustrated in Figure 7, the exhaust port E6 is connected to the port PP2 for a period such that the pressure in pipe 69 is reduced by an amount to balance the force applied to the valve. Likewise, if an upward force is applied to the valve 71g, the valve is moved upwardly, from the position illustrated, the port PRP2 is placed in communication with the port PP2 until the pressure in the port PP2 and pipe 69 is increased an amount to balance the force applied to the valve.

It should be observed that the construction and arrangement of the force generator is such that when not actuated manually or when the valve 71g is not acted upon by some external force, it places the system in equilibrium. For example, if the pressure in the port PP2 is less than one-half of the pressure in the port PRP2, then the valve 71g will be moved by the superior force of the pressure of the oil in the port PRP2 to open the port PRP2 to the port PP2 until the pressure of the oil in the port PP2 is sufficient to balance the force exerted by the oil in the port PRP2 and close the valve. Likewise, if the pressure of the oil in port PP2 is more than half the pressure of the oil in the port PRP2, the valve will be moved downwardly to open the port PP2 to the exhaust until the forces on the valve 71g are balanced.

From the above description of the embodiment of the invention illustrated in the drawings, it will be seen that the invention provides a hydraulically operated "angle gyro" in which the parts operated in accordance with the movements of the gyroscope relative to its support are operated continuously and the precessing forces are derived and applied to the gyroscope as hydraulic pressures.

It will be obvious that various changes may be made by those skilled in the art in the details of the embodiment illustrated in the drawings and described in detail above within the principle and scope of the invention as expressed in the appended claims.

We claim:

1. In an angle gyro for tracking a target, the combination comprising a universally mounted gyroscope, hydraulically operated means connected to said gyroscope for applying precessing forces thereto, means for producing precessing forces proportional to the movement of the target including a hydraulic pressure calculating mechanism for producing resultant pressures of a hydraulic medium proportional to the angular rate of change in bearing and elevation of a moving target, and means for transmitting said resultant pressures to said hydraulically operable means to operate the same to effect precession of the gyroscope.

2. In an angle gyro for tracking a target, the combination comprising a universally mounted gyroscope, hydraulically operated means connected to said gyroscope for applying precessing forces thereto, means for producing precessing forces proportional to the movement of the target including a hydraulic pressure calculating mechanism for producing resultant pressures of a hydraulic medium proportional to the angular rate of change in bearing and elevation of a moving target, means for transmitting said resultant pressures to said hydraulically operable means to operate the same to effect precession of the gyroscope, and means for manually modifying the said precessing forces.

EDWARD J. POITRAS.
JAMES D. TEAR.
WILLIAM H. NEWELL.